United States Patent [19]
Bobbitt, III et al.

[11] Patent Number: 5,626,059
[45] Date of Patent: May 6, 1997

[54] CLAMPING MECHANISM FOR AN ADJUSTABLE STEERING COLUMN

[75] Inventors: John T. Bobbitt, III, Warwickshire; Stephen J. Baker, Staffordshire, both of England

[73] Assignee: The Torrington Company, Torrington, Conn.

[21] Appl. No.: 560,723

[22] Filed: Nov. 20, 1995

[30] Foreign Application Priority Data

Dec. 1, 1994 [GB] United Kingdom ............... 9424251

[51] Int. Cl.$^6$ ............................................. B62D 1/18
[52] U.S. Cl. .................... 74/493; 74/500.5; 74/521; 74/531; 280/775; 24/494; 24/502
[58] Field of Search ............................ 74/493, 500.5, 74/502.4, 502.6, 520, 521, 531; 280/775; 24/494, 495, 502

[56] References Cited

U.S. PATENT DOCUMENTS

| | | | |
|---|---|---|---|
| 2,114,663 | 4/1938 | Erickson | 74/521 X |
| 3,803,939 | 4/1974 | Schenten | 74/493 |
| 4,307,626 | 12/1981 | Sanada et al. | 74/493 |
| 4,716,811 | 1/1988 | Johnson | 24/495 X |
| 4,753,121 | 6/1988 | Venable et al. | 74/493 |
| 4,869,351 | 9/1989 | Romano | 188/24.21 |
| 5,148,717 | 9/1992 | Yamaguchi | 74/493 |
| 5,259,264 | 11/1993 | Bodin et al. | 74/493 |

FOREIGN PATENT DOCUMENTS

| | | | |
|---|---|---|---|
| 54-57864 | 5/1979 | Japan | 24/495 |
| 2142904A | 1/1985 | United Kingdom. | |
| 91/06461 | 5/1991 | WIPO. | |

*Primary Examiner*—Richard M. Lorence
*Attorney, Agent, or Firm*—Michael H. Minns

[57] ABSTRACT

A clamping mechanism for an adjustable steering column includes clamping members which are drawn by a spring against sides of a steering column mounting bracket which flexes to clamp a steering column supporting adjustment bracket. The clamping members are located at opposite pivot points of a parallelogram linkage which has intermediate pivot points coupled to a Bowden cable with sheath. Operating the Bowden cable to draw arms of the linkage together against the bias of the spring causes the clamping members to be unclamped to allow adjustment of the steering column.

8 Claims, 1 Drawing Sheet

CLAMPING MECHANISM FOR AN ADJUSTABLE STEERING COLUMN

BACKGROUND OF THE INVENTION

This invention relates to a clamping mechanism for an adjustable steering column.

Existing steering column clamping mechanisms sometimes require large complex operators and handles adjacent the clamping mechanism on the steering column. With today's smaller cars, the space available for these operators and handles is limited.

The foregoing illustrates limitations known to exist in present steering column clamping mechanism. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a clamping mechanism for an adjustable steering column, the column mechanism comprising: a clamping member means for clamping the steering column; a linkage mechanism coupled to the clamping member means, the linkage mechanism having two first arms, one end of each first arm being pivotally connected to the clamping member means, the other end of each first arm being pivotally connected to one another at a first common pivot point; a resilient means for normally biasing the clamping member means into clamping engagement with the steering column; and an operator means for moving the linkage arms against the bias of the resilient means to unclamp the steering column, the operator means being connected to the linkage mechanism first common pivot point.

The foregoing and other aspects will become apparent from the following detailed description of the invention when considered in conjunction with the accompanying drawing figures.

BRIEF DESCRIPTION OF THE DRAWING FIGURES

FIG. 1 is a diagrammatic end view of an adjustable steering column with a clamping mechanism for it; and FIG. 2 is a diagrammatic plan view of the clamping mechanism shown in FIG. 1.

DETAILED DESCRIPTION

Figure 1:
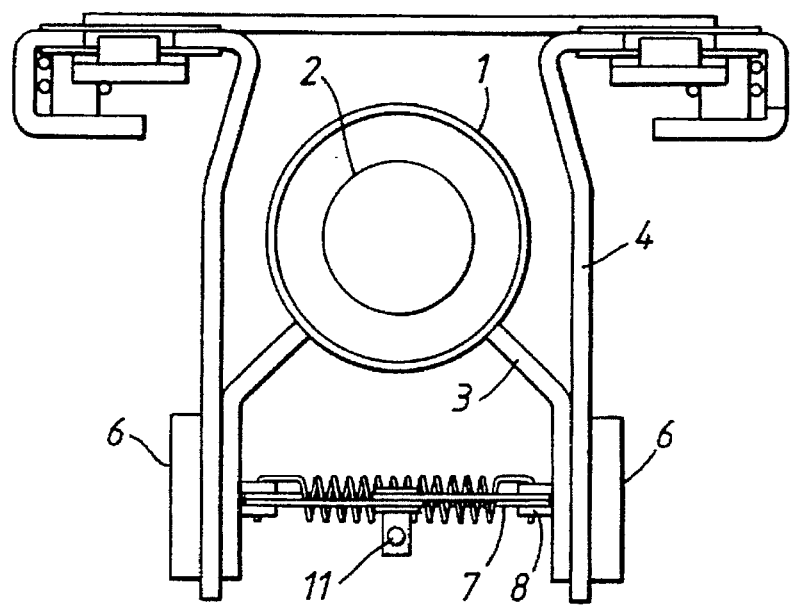

Vehicle steering columns can be rake and/or reach adjustable and various clamping mechanisms are known to clamp such steering columns after adjustment by the driver.

According to the present invention, there is provided a clamping mechanism for an adjustable steering column, the mechanism including a clamping member to clamp the steering column, the clamping member being coupled to one part of a linkage with resilient means for normally biassing the clamping member into clamping engagement with the steering column and there being means coupled to another part of said linkage actuable to move said linkage against the resilient bias to unclamp the steering column.

Preferably, two clamping members are provided, each one being coupled to opposite reactive portions of the linkage, of which said one part forms one such portion.

The linkage can be in the form of a parallelogram comprising four arms pivoted to one another. Said one part to which the firstmentioned clamping member is coupled can be at one of the pivot points and, in the case where two clamping members are provided, the opposite pivot point forms the opposed reactive portion, to which the second clamping member is coupled.

The resilient bias can be a resilient means in the form of a tension spring linking these opposed portions acting to draw them and thus the two clamping members towards one another.

The means coupled to said other part of the linkage to move the linkage against the resilient bias can be in the form of a Bowden cable with the cable itself coupled to the third of the remaining pivot points between two arms of the parallelogram linkage and a sheath of the Bowden cable being coupled to the other two arms of the parallelogram linkage at the last remaining pivot point.

The end of the Bowden cable remote from the parallelogram linkage can be coupled to a manually-operable actuating member of the clamping mechanism. Instead and/or in addition electrical or vacuum actuating or other mechanical means cab be provided.

The FIGURES show a steering column tube 1 surrounding a steering column shaft 2. The steering column tube 1 is provided with a supporting adjustment bracket 3, which is slidable for adjustment in slots (not shown) provided in a steering column mounting bracket 4.

A clamping mechanism 5 is provided to clamp the steering column tube 1 via its supporting bracket 3 in any desired position. The clamping mechanism 5 includes two clamping members 6 each coupled to one part of a parallelogram linkage 7 with four arms 7A, 7B, 7C and 7D, respectively linked to one another at pivot points 8.

The clamping members 6 are coupled to two respective parts of the parallelogram linkage 7 on opposed pivot points 8 thereof. Resilient means in the form of a tension spring 9 extends between these pivot points 8 to link these two parts of the linkage so as normally to act to draw the clamping members 6 towards one another.

Figure 2:
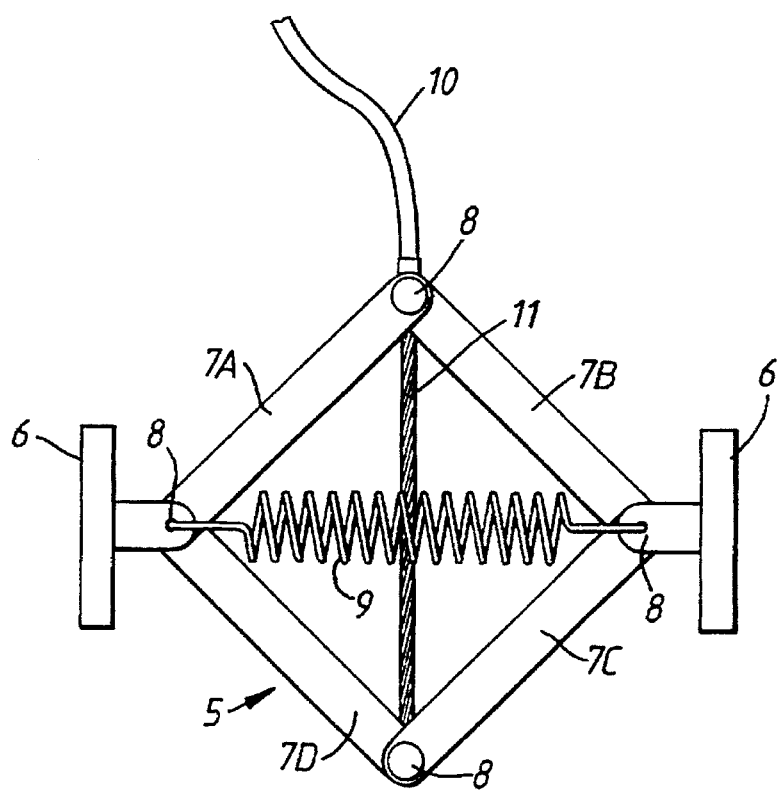

As can be seen from FIG. 1, this action of the spring 9 has the effect of drawing the clamping members against the sides of the steering column support bracket 4, which in turn transmits the clamping load by flexing and clamping on the steering column adjustment bracket 3 and hence the steering column tube 1. To release the clamping load, the parallelogram linkage 7 is provided with a sheathed cable operator, also as a Bowden cable which in usual manner comprises a sheath 10 surrounding an actuating cable 11. As can be seen from FIG. 2, one end of the cable 11 is coupled to a third one of the pivot points 8 of the parallelogram linkage 7 between the arms 7C and 7D, while the sheath 10 is coupled to the opposing fourth pivot point 8 between the arms 7A and 7B.

It will therefore be seen that the act of drawing the visible end of the cable 11 into the sheath 10 will have the effect of pulling the arms 7A and 7B on the one hand and 7C and 7D on the other hand together against the bias of the spring 9. This pushes the two clamping members 6 away from one another, thereby releasing the clamping effort to allow adjustment of the steering column.

It will be appreciated that the clamping mechanism allows an actuating handle (not shown) for the Bowden cable to be mounted remotely from the clamping mechanism to provide improved access. The mechanism is compact which facilitates packaging and it can be easily adapted to various forms of actuating means such as electrical or vacuum-operated means. Furthermore, the mechanism is designed to be failsafe in that, if the lock-unlock actuating means fails, the steering column would be automatically locked into position by virtue of the resilient bias.

It will also be appreciated that the present construction allows for the possibility of providing greater clearance in the knee area of the driver since the actuating mechanism can be located in other positions, thus serving to meet vehicle safety requirements.

In another embodiment of the present construction, only two arms 7C and 7D are provided. A cable operator is attached to pivot point 8 between arms 7C and 7D. This cable operator acts to overcome the bias of spring 9 and pulls the pivot point 8 between arms 7C and 7D towards the spring thereby releasing the clamping force applied by clamping members 6.

In practice, the steering column can incorporate several clamping mechanisms as described, all activated at a single location, in order to increase clamp loads as required.

Having described the invention, what is claimed is:

1. A clamping mechanism for an adjustable steering column, the clamping mechanism comprising:

a clamping member means for clamping the steering column;

a linkage mechanism coupled to the clamping member means, the linkage mechanism having two first arms, one end of each first arm being pivotally connected to the clamping member means, the other end of each first arm being pivotally connected to one another at a first common pivot point;

a resilient means for normally biasing the clamping member means into clamping engagement with the steering column; and an operator means for moving the linkage arms against the bias of the resilient means to unclamp the steering column, the operator means being connected to the linkage mechanism first common pivot point.

2. The clamping mechanism according to claim 1, wherein the linkage mechanism has four arms, two first arms and two second arms, one end of each second arm being pivotally connected to the clamping member means, the other end of each second arm being pivotally connected to one another at a second common pivot point, the four arms forming a parallelogram.

3. The clamping mechanism according to claim 2, wherein the operator means is a sheathed cable, the cable being connected to the first common pivot point and the cable sheath being connected to the second common pivot point.

4. A clamping mechanism for an adjustable steering column, the clamping mechanism comprising:

a clamping member to clamp the steering column;

a linkage in the form of a parallelogram having four arms pivoted to one another at first, second, third and fourth pivot points, respectively, the clamping member being coupled to the linkage at the first pivot point, the first pivot point being opposite the third pivot point;

resilient means for normally biasing the clamping member into clamping engagement with the steering column, the resilient means being coupled to the linkage at the first and third pivot points; and operator means for moving the linkage against the resilient bias to unclamp the steering column, the operator means being coupled to the second pivot point.

5. The clamping mechanism according to claim 4, wherein the resilient means is a tension spring.

6. The clamping mechanism according to claim 4, wherein two clamping members are provided, the second clamping member being connected to the third pivot point.

7. The clamping mechanism according to claim 4, wherein the operator means is a sheathed cable, the cable being connected to the second pivot point, the cable sheath being connected to the fourth pivot point, the second pivot point being opposite the fourth pivot point.

8. A clamping mechanism for an adjustable steering column, the clamping mechanism comprising:

a clamping member means for clamping the steering column;

a linkage mechanism coupled to the clamping member means, the linkage mechanism having four arms, two first arms and two second arms, one end of each first arm being pivotally connected to the clamping member means, the other end of each first arm being pivotally connected to one another at a first common pivot point, one end of each second arm being pivotally connected to the clamping member means, the other end of each second arm being pivotally connected to one another at a second common pivot point, the four arms forming a parallelogram;

a resilient means for normally biasing the clamping member means into clamping engagement with the steering column; and an operator means for moving the linkage arms against the bias of the resilient means to unclamp the steering column, the operator means being a sheathed cable, the cable being connected to the first common pivot point and the cable sheath being connected to the second common pivot point.

* * * * *